United States Patent [19]

Engall

[11] Patent Number: 4,491,504
[45] Date of Patent: Jan. 1, 1985

[54] APPARATUS FOR TREATING CELLULOSIC MATERIAL WITH A SCREW FEEDER EXTENDING INTERNALLY WITHIN A TREATMENT VESSEL

[75] Inventor: John F. Engall, Brantford, Canada
[73] Assignee: The Bauer Bros. Co., Springfield, Ohio
[21] Appl. No.: 461,314
[22] Filed: Jan. 27, 1983
[51] Int. Cl.³ .................. D21C 7/00; D21C 7/06; D21C 7/08
[52] U.S. Cl. .................. 162/237; 162/246; 162/247
[58] Field of Search .......... 162/237, 243, 246, 17, 162/52, 18, 247

[56] References Cited

U.S. PATENT DOCUMENTS

| | | | |
|---|---|---|---|
| 2,673,690 | 3/1954 | Segl | 162/18 |
| 3,549,483 | 12/1970 | Fair | 162/237 |
| 3,841,465 | 10/1974 | Miller, Jr. et al. | 162/18 |

FOREIGN PATENT DOCUMENTS 2503356  9/1975  Fed. Rep. of Germany ...... 162/246

Primary Examiner—Steve Alvo
Attorney, Agent, or Firm—William W. Habelt

[57] ABSTRACT

Cellulosic material, such as wood chips, is fed from a storage bin (10) through a compacting screw feeder (12) to an impregnation chamber (16) in housing (14) wherein the material is contacted with a treatment liquid. The impregnated chips and treatment liquid are passed from chamber (16) by a triple flight intermeshing screw feeder (18) directly to the interior of an inclined treatment vessel (20) wherein the material is digested by cooking at elevated temperature and pressure in both the treatment liquid and a treatment vapor.

17 Claims, 6 Drawing Figures

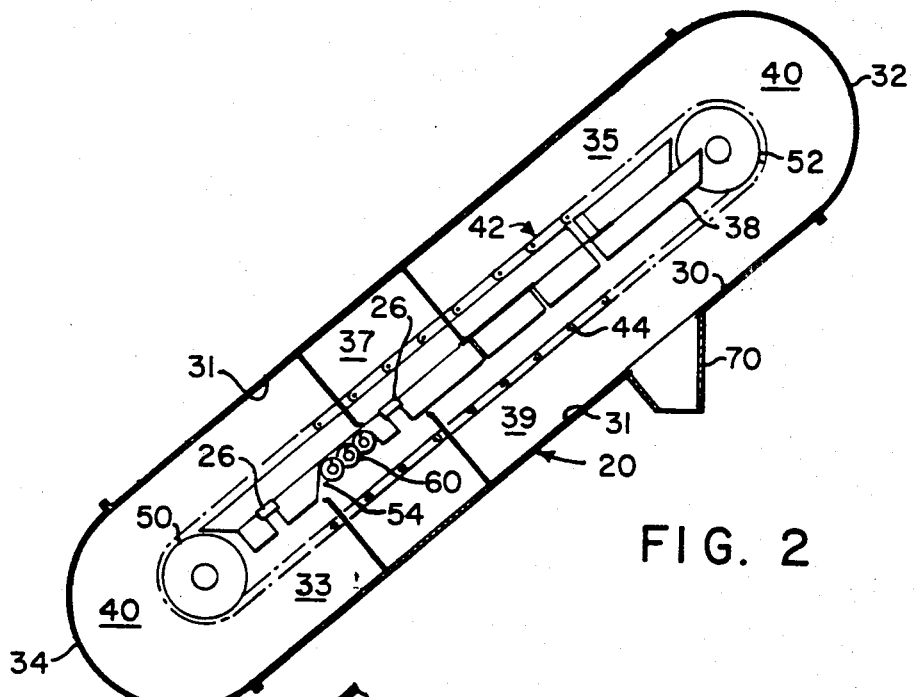
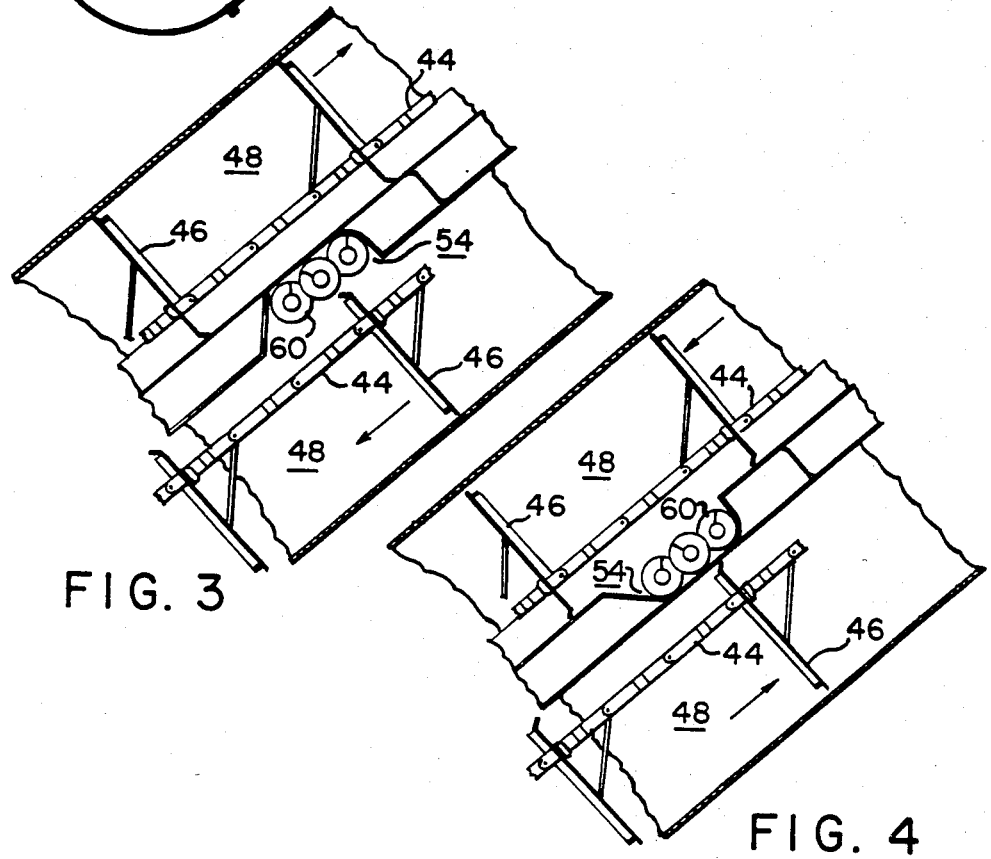

APPARATUS FOR TREATING CELLULOSIC MATERIAL WITH A SCREW FEEDER EXTENDING INTERNALLY WITHIN A TREATMENT VESSEL

BACKGROUND OF THE INVENTION

The present invention is related to the treatment of cellulosic material, such as wood pulp, and, more particularly, to a continuous treatment digester of the moving conveyor type.

It is well known in the art to chemically treat cellulosic materials to produce cellulosic pulp by impregnating the cellulosic material with a treatment liquid that dissolves lignin and digests the impregnated material at elevated temperature and pressure by inducing a solvent action on lignin to free cellulosic fibers. One such process involves the utilization of a single digester vessel for both chemical impregnation and vapor phase digesting or cooking of the impregnated material. Such a process, as well as an apparatus for carrying out the process, is disclosed in U.S. Pat. No. 3,549,483.

As disclosed therein, cellulosic material is continuously introduced into a warm cooking liquor housed in the lower portion of an inclined elongated cylindrical vessel. The incoming material is deposited onto a conveyor which is disposed along the axis of the vessel and serves to carry the material through the cooking liquor and then into the cooking vapor housed within the vessel above the liquid-vapor interface. The material may be passed either concurrently or countercurrently through the cooking liquor, thence through the vapor liquor interface and into the vapor phase to an outlet located within the vapor phase enclosing portion of the inclined vessel. The digested material withdrawn from the vessel may undergo further processing downstream thereof as is well known in the art, such as cooking, washing, bleaching, refining and the like.

Continuous feeding of cellulosic material to be treated within the vessel has always been a problem. The most conventional technique for feeding fibrous material to the vessel has been to meter uncompacted chips in the presence of air into a rotary valve or screw feeder which convey the chips to a gas filled chamber which opens through the top side of the inclined vessel. The chips passing from the rotary valve or the screw feeder then fall by gravity through the gas filled chamber into the pockets between the flights of the conveyor and are then picked up by the flights of the conveyor and conveyed into and through the treatment liquid. However, it is difficult to obtain uniform feed between flights of the conveyor and to fill the volume between flights across the entire width of the conveyor. Feeding techniques of this type are disclosed in U.S. Pat. Nos. 3,111,832 and 3,135,651.

Another technique for feeding cellulosic material to a digester vessel is disclosed in U.S. Pat. No. 3,549,483 wherein a screw feeder is used to feed cellulosic material through an opening located in the underside of the inclined vessel at a point below the liquid level within the vessel. Again, the material is fed through a single opening in the vessel so as to fall between the flights of the conveyor as the material discharges from the screw feeder and to be picked up by the flights and conveyed through the treatment liquid. This technique also suffers from the inability to uniformly fill the volume of the pockets between flights with material across the entire width of the conveyor.

SUMMARY OF THE INVENTION

It is therefore an object of the present invention to provide an apparatus of the moving conveyor type for treating a cellulosic material wherein the cellulosic material is continuously and positively fed into the vessel so as to uniformly fill the pockets between the flights across the entire width of the conveyor flights.

Such an apparatus for treating a cellulosic material is provided which comprises a longitudinally elongated vessel defining therein a treatment chamber for holding a treatment liquid and a treatment vapor, partition means disposed along the longitudinal axis of the vessel for dividing the treatment chamber into longitudinally elongated first and second subchambers disposed on opposite sides of the partition means with the longitudinal extremities of the partition means terminating short of the longitudinal extremities of the vessel so as to provide a continuous passage about the partition means, transport means mounted about the partition means in the continuous passage for moving cellulosic material about the partition means and through the first and second chambers, and internal feeder means for dispensing cellulosic material to the transport means at a location within the liquid filled portion of the vessel.

In accordance with the invention, the feeder means is disposed internally within the vessel in the partition means and open to the transport means at a point below the liquid level in the treatment chamber. Preferably, the feeder means comprises a screw feeder and, more preferably, the feeder mmeans comprises a triple-flight intermeshing variable-speed screw feeder.

To further improve the feeding process, the present invention further comprises a external feeder means disposed outside of the vessel and opening in fluid communication to the internal feeder means for passing cellulosic material to the internal feeder means for dispensing to the transport means. Preferably, the external feeder means comprises a compacting screw feeder for dewatering and de-aerating the cellulosic material prior to its introduction to the vessel.

Additionally, the apparatus of the present invention may further comprise a housing disposed externally of the treatment vessel between the external feeder means and the internal feeder means and defining an enclosed impregnation chamber having a first opening for receiving cellulosic material from the external feeder means and a second opening spaced therefrom for passing the cellulosic material to the internal feeder means, and means for passing a treatment liquid into the impregnation chamber so as to contact the cellulosic material as it passes through the impregnation chamber from the first opening to the second opening. Preferably, the internal feeder means extends from the partition means within the vessel externally thereof through the wall of the vessel and through the second opening in the housing into the impregnation chamber defined within the housing.

In a further preferred embodiment of the invention, the longitudinally elongated vessel is inclined in an acute angle with the horizontal and the partition means is disposed along the inclined longitudinal axis of the vessel so as to divide the treatment chamber into a longitudinally elongated first subchamber disposed aboe the partition means and a longitudinally elongated second subchamber disposed beneath the partition means.

The internal feeder means is disposed within the partition means so as to dispense cellulosic material downwardly into the second subchamber disposed beneath the partition means onto the transport means disposed therein at a location below the level of treatment liquid within the inclined vessel.

Further, drive means operatively associated with the transport means are provided for moving the transport means beneath the internal feeder means to receive the cellulosic material and for transporting the received cellulosic material downwardly through the liquid filled portion of the second subchamber, thence around the lower end of the partition means and upwardly through the liquid filled portion of the first subchamber, thence through the liquid-vapor interphase in the first subchamber, thence upwardly through the vapor filled portion of the first subchamber, and thence around the upper extremity of the partition means and downwardly through the vapor filled portion of the second subchamber to a material outlet in the underside of the vessel.

BRIEF DESCRIPTION OF THE DRAWINGS

Other objects and advantages of the present invention will be evident from the following detailed description of a preferred embodiment of the present invention taken in conjunction with the accompanying drawings wherein:

FIG. 2 is a longitudinal sectional view of a continuous treatment apparatus designed in accordance with the preferred embodiment of the present invention;

FIG. 3 is an enlarged sectional view of the treatment vessel of the preferred embodiment of the present invention illustrating the internal feeding means feeding of material downwardly onto the transport means;

FIG. 4 is an enlarged sectional view of the treatment vessel of the present invention showing the internal feeding means feeding material upwardly to the transport means;

DESCRIPTION OF A PREFERRED EMBODIMENT

Figure 1:
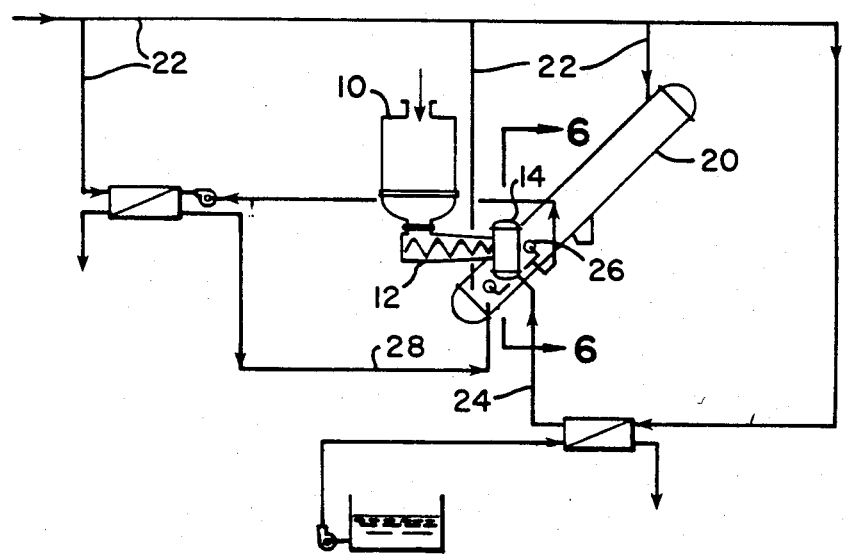
FIG. 1 is a schematic illustration of a wood pulp treatment system utilizing the apparatus of the present invention.

Referring now to the drawings, there is depicted therein an illustrative embodiment of the treatment apparatus of the present invention wherein the apparatus is utilized for digesting wood pulp in a cooking liquor and/or vapor. In FIG. 1, the treatment apparatus of the present invention is illustrated in a wood pulp treatment system wherein the wood pulp is treated in a single vessel with both a treatment liquor and treatment vapor.

Wood chips are fed from the storage bin 10 through the external feeder means 12 to an impregnation chamber housing 14 defining therein an impregnation chamber 16 wherein the wood chips discharging from the external feeder 12 are contacted with a treatment liquid. The impregnated chips and treatment liquid pass from chamber 16 through internal feeder means 18 directly to the interior of the treatment vessel 20 wherein the chips are digested by cooking at elevated temperature and pressure in both the liquid phase in the treatment liquid and the vapor phase in a treatment vapor.

A treatment vapor, such as steam, is supplied to the treatment vessel at an elevated temperature and pressure to provide for the vapor phase cooking of the wood chips. A treatment liquid, such as sodium bisulfite, is supplied to the treatment vessel through the impregnation chamber 16 and withdrawn from the treatment vessel through liquid return outlets 26. Preferably, the withdrawn cooking liquor is reheated back to digesting temperature and passed as recycle liquid 28 back to the treatment vessel. Make-up treatment liquid may be added through the impregnation housing 14 as necessary. A portion of the elevated temperature treatment vapor may be utilized as a heat exchange fluid for reheating the recycle treatment liquid 28 or preheating the incoming treatment liquid 24 rather than being passed to the treatment vessel 20 to be utilized as the treatment vapor per se.

As best seen in FIG. 2, the treatment vessel 20 of the present invention comprises a longitudinally elongated generally cylindrical vessel 30 defining therein a treatment chamber for holding the treatment liquid and the treatment vapor. Typically, the treatment vessel 20 is inclined at an acute angle with the horizontal, preferably of approximately 45°. The level of treatment liquid within the cylindrical vessel 30 defines a boundary 31 within the vessel between a first liquid filled portion 33 of the treatment chamber and a second vapor filled portion 35 of the treatment chamber. A head cap 32 and a bottom cap 34 are sealed to the longitudinal extremities of the cylindrical vessel 30 thereby closing the upper and lower ends, respectively, of a cylindrical shell 30.

Disposed within the interior of the shell 30 is a partition means 38 which extends along the longitudinal axis of the shell 30 and across the entire width of the shell 30 thereby dividing the treatment chamber within the shell 30 into longitudinally elongated first and second subchambers 37 and 39 disposed on opposite sides the partition means 38. The first subchamber 37 forms an upper subchamber above the inclined partition means 38 which extends through both the liquid filled portion 33 and the vapor filled portion 35 of the treatment chamber. Similarly, the second subchamber 39 forms a lower subchamber beneath the inclined partition means 38 which also extends through both the liquid filled portion 33 and the vapor filled 35 of the treatment chamber. The longitudinal extremities of the partition means 38 terminate short of longitudinal extremities of the vessel 20 so as to provide a continuous passage 40 about the partition means.

Transport means 42 is mounted about a partition means 38 for moving the cellulosic material to be treated through the continuous passageway 40 formed about the partition means 38. As shown in FIGS. 2, 3 and 4, the transport 42 preferably comprises an endless chain conveyor 42 having a plurality of perforate conveyor flights 44 mounted thereon in spaced relationship so as to extend across the width of the passageway 40 and to form open ended pockets 48 between neighboring conveyor flights. The endless chain conveyor 44 is mounted on sprocket wheels 50 and 52 disposed at the longitudinal extremities of the partition means 38. At least one of the sprocket wheels 50 or 52 is connected by a shaft extending through the wall of the shell 30 of the vessel 20 to a motor disposed externally of the vessel 20 to serve as a means for driving the transport means 42.

In accordance with the present invention, feeder means 60 for dispensing cellulosic material to the transport means 42 is disposed internally within the vessel 20 in a recess 54 in the partition means 38 at a point below the liquid level 31 in the vessel. The recess 54 in the partition means 38 in which the feeder means 60 is disposed may be open on the underside of the partition means 38 so as to permit cellulosic material to be fed downwardly into the pockets 48 formed between the flights 46 of the chain conveyor 44 as it passes through the liquid filled portion 33 of the lower subchamber 39 as shown in FIG. 3, or the recess 54 and partition means 38 may be open on the topside of the partition means 38 so as to permit cellulosic material to be fed from the feeder 60 upwardly into the pockets 48 between the conveyor flights 46 of the continuous chain conveyor 44 as it passes through the liquid filled portion 33 of the upper subchamber 37 as shown in FIG. 4.

In either case, by disposing the feeder means 60 in the partition means 38 along the center line of the longitudinal axis of the treatment vessel, the positive movement of the cellulosic material to the transport means 42 as it passes through either the upper subchamber 37 or the lower subchamber 39 is insured so that the entire volume of the pockets 48 over the entire width of the passageway 40 will receive cellulosic material. Further, by providing for the cellulosic material to be either fed upwardly to the transport means 42 as it traverses the upper subchamber 37 or downwardly to the transport means 42 as it traverses the lower subchamber 39, the period of time for which the cellulosic material is exposed to treatment within the vessel 20 may be controlled.

In the preferred embodiment, the feeder means 60 comprises a screw feeder, and more preferably, the feeder means 60 comprises a triple-flight intermeshing screw feeder as shown in the drawing, and even more preferably, a variable speed triple-flight intermeshing screw feeder. A screw feeder will insure positive movement of the cellulosic material across the entire width of the passageway 40 so that the entire volume of the pockets 48 between the conveyor flights 46 of the endless chain conveyor 44 will receive cellulosic material. Additionally, if the cellulosic material being fed to the treatment vessel 20 by means of the screw feeder 60 is immersed in treatement liquid as is the case in the embodiment shown in the drawings, the use of a screw feeder will enhance the impregnation of the cellulosic material by the treatment liquid by mechanically compressing the treatment liquid and the cellulosic material between the flights of the screw feeder as the material is fed to the vessel 20.

Figure 5:
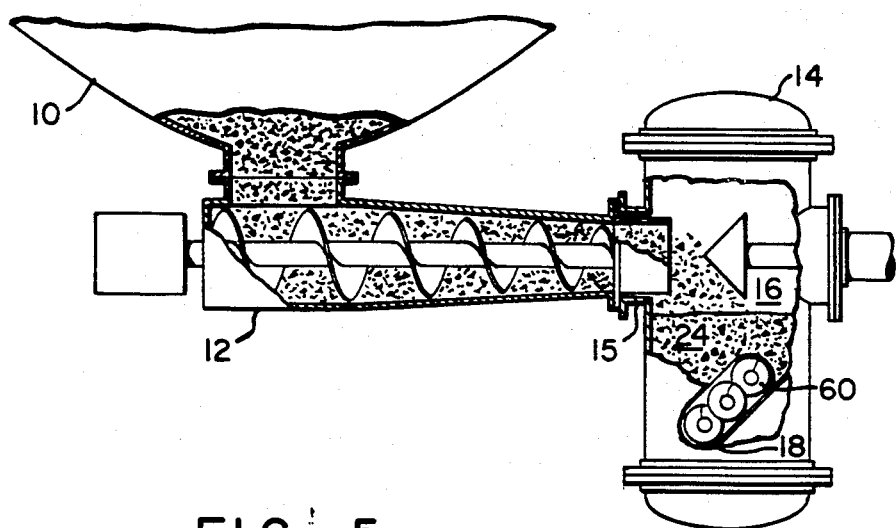
FIG. 5 is a elevational section of the feeder means of the present invention disposed externally of the treatment vessel.
Figure 6:
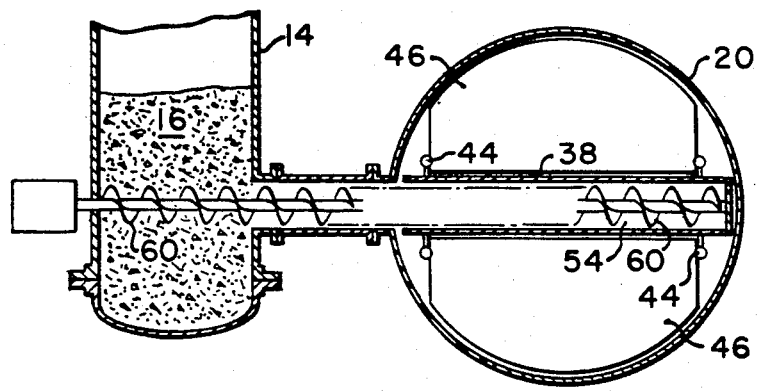
FIG. 6 is a cross sectional view of the feeder means of the present invention taken along line 6—6 of FIG. 1.

Although it is within the scope of the present invention to merely feed cellulosic material from a supply bin directly to the vessel 20 by means of a feeder means 60 disposed within the partition means 38 along the longitudinal axis of the treatment chamber defined within the vessel shell 30, it is preferred that the cellulosic material to be treated first be passed from a supply bin 10 to an impregnation housing 14 wherein the chips are contacted with the treatment liquid prior to entering the treatment vessel 20. As best seen in FIGS. 5 and 6, the cellulosic material is passed from the supply bin 10 to the external feeder means 12 which conveys the cellulosic material to the impregnation housing 14 and discharges the cellulosic material into the impregnation chamber 16 defined within the housing 14 through a first opening 15 and the upper portion of the housing 14. Within the impregnation chamber 16, the cellulosic material discharging from the external feeder means 12 is contacted with the treatment liquid 24 as the chips pass from the feeder 12 downwardly through the chamber to an outlet opening 18 in the lower region of the treatment chamber 16. In this manner, the cellulosic material is impregnated to some extent with the treatment liquid prior to being fed to the treatment vessel 20.

In the preferred embodiment as best illustrated in FIG. 6, the internal feeder means 60 extends from the partition means 38 within the treatment vessel 20 externally thereof through the wall of a vessel shell 30 and into the impregnation housing 14 through the outlet opening 18 in a lower region thereof. Therefore, the cellulosic material to be treated and the treatment liquid are passed directly from the impregnation housing 14 to the treatment vessel 20 and discharged onto the transport means 42 at a location below the liquid level 31 within the treatment vessel 20. As mentioned previously, by utilizing a screw conveyor, and preferably a triple flight intermeshing screw conveyor, for feeder means 60, the cellulosic material will be further impregnated with treatment liquid as the cellulosic material is passed from the impregnation chamber 16 to the treatment vessel 20.

Preferably, the external feeder means 12 comprises a compacting screw feeder of the type which will dewater and deaearate the cellulosic material as it passes from the supply bin 10 to the impregnation housing 14. A conventional compacting screw feeder commonly referred to as a plug screw feeder is shown in the drawing as the external feeder means 12. The plug screw feeder has screw flights 62 adapted to compress and compact the cellulosic material as it passes along the length of the screw to force water and air out of the cellulosic material as it traverses the screw. The water and air pressed out of the cellulosic material as it passes through the plug screw feeder is drained through openings in the housing of the screw feeder. Additionally, a conical plug 64 is disposed axially opposite and alignment with the outlet of the feeder 12 to provide a back pressure on the cellulosic material passing through the screw.

In operation, the cellulosic material to be treated, such as wood chips, are introduced from the supply bin 10 into the plug screw feeder 12 and fed through the opening 15 in the wall of the impregnation housing 14 into the impregnation chamber 16. In the impregnation chamber 16, the wood chips pass downwardly in contact with and through a treatment liquid 24, such as sodium bisulfite. The partially impregnated wood chips and treatment liquid are then passed via the triple flight intermeshing screw conveyor 60 from the lower portion of the impregnation chamber 16 through an opening 18 in a lower portion of the impregnation housing 14 directly into the treatment vessel 20 through the shell 30 thereof into the recess 54 and the partition means 38. Additional treatment liquid may be added directly to the treatment vessel 20 to establish the desired liquid level within the treatment chamber. Additional impregnation of the wood chips with the treatment liquid will occur as the wood chips traverse the screw feeder 60.

The impregnated wood chips are then discharged either upwardly or downwardly, as desired, into the pockets 48 formed between the flights 46 of the endless chain conveyor 44. If the wood chips are disccharged downwardly from the screw feeder 60 through the transport means 42, as it passes through the lower subchamber 39, the transport means 42 will be rotated in a clockwise direction as shown in FIG. 3. The wood chips deposited into the pockets 48 between the flights 46 of the endless chain conveyor 44 are then conveyed through the passage 40 around the partition means 38, first passing downwardly through the liquid filled portion 33 of the lower subchamber 39, then around the lower end of the partition means 38 and upwardly through the liquid filled portion 33 of the upper subchamber 37, through the liquid vapor interface 31, thence upwardly through the vapor filled portion 35 of the upper subchamber 37, thence around the upper end of the partition means 38, and downwardly through the vapor filled portion 35 of the lower subchamber 39 to the material outlet opening 70 in the underside of the upper portion of the vessel shell 30. As the wood chips pass through the liquid filled portion 39 of the treatment vessel 20, the wood chips are thoroughly and uniformly impregnated with cooking liquor. As a result of passing through the vapor filled portion 35, the impregnated wood chips are rapidly digested. The digested material passing through the outlet opening 70 is then further processed by any of a number of means well known in the art.

In a further modification, the conveying of the wood chips through the treatment vessel 20 may be counterclockwise as illustrated in FIG. 4. In this embodiment, the wood chips pass from the screw feeder 60 upwardly into the pockets 48 between the flights 46 of the downwardly moving endless chain conveyor 44. The impregnated wood chips are conveyed first downwardly through the liquid filled portion 33 of the upper subchamber 37, thence around the lower end of the partition means 38, thence upwardly through the liquid portion 33 of the lower subchamber 39, thence through the liquid vapor interface 31, and thence upwardly through the vapor filled portion 35 of the lower subchamber 39 to the outlet opening 70 in the underside of the upper portion of the vessel shell 30.

The apparatus of the present invention may obviously be utilized in any number of treatment processes for cellulosic material. The particular operating temperatures and pressures of the process as well as the specific nature of the treatment liquid and vapor are not germane to the present invention. Furthermore, many modifications and variations of the present invention may be possible and evident to those skilled in the art in light of the teachings of the present application. It is to be understood that the specific embodiment shown in the drawing of the utilization of the apparatus as a wood chip digester is merely illustrative of the invention and is by no means meant as a limitation. Accordingly, it is intended that any modification which is apparent to those skilled in the art in light of the foregoing description and which falls within the spirit and scope of the appended claims be included in the invention as recited in the appended claims.

I claim:

1. An apparatus for treating a cellulosic material comprising:
    a. a longitudinally elongated vessel defining therein a treatment chamber for holding a treatment liquid and a treatment vapor, the level of the treatment liquid defining a boundary between a first liquid filled portion of the chamber and a second vapor filled portion of the chamber;
    b. partition means disposed along the longitudinal axis of said vessel for dividing the treatment chamber into longitudinally elongated first and second subchambers disposed on opposite sides of said partition means, each of the subchambers extending through the liquid filled and vapor filled portions of the treatment chamber, the longitudinal extremities of said partition means terminating short of the longitudinal extremities of said vessel so as to provide a continuous passage about said partition means, said partition means having a recess below the level of the treatment liquid;
    c. transport means mounted about said partition means for moving cellulosic material about said partition means and through the first and second subchambers;
    d. feeder means for receiving cellulosic material from a supply thereof external to said vessel and dispensing said received cellulosic material to said transport means at a location in the first liquid filled portion of the vessel, said feeder means comprising screw feeder means extending internally within said vessel in said partition means recess and opening to said transport means at a point below the liquid level in the chamber; and
    e. means for withdrawing cellulosic material from the vessel at at a location in the second vapor filled portion of the vessel.

2. An apparatus as recited in claim 1 wherein said transport means comprises an endless chain conveyor having a plurality of perforate conveyor flights mounted thereon.

3. An apparatus as recited in claim 1 wherein said internal feeder means comprises a triple-flight intermeshing variable-speed screw feeder.

4. An apparatus as recited in claim 1 further comprising an external feeder means disposed outside of said vessel and opening in flow communication to said internal feeder means for passing cellulosic material to said internal feeder means for dispensing to said transport means.

5. An apparatus as recited in claim 4 wherein said external feeder means comprises a compacting screw feeder for deaerating and dewatering the cellulosic material prior to introduction to said internal feeder means.

6. An apparatus as recited in claim 5 wherein said internal feeder means comprises a triple-flight intermeshing variable-speed screw feeder.

7. An apparatus as recited in claim 4 further comprising:
    a. a housing disposed externally of said vessel between said external feeder means and said internal feeder means defining an enclosed impregnation chamber having a first opening for receiving cellulosic material from said external feeder means and a second opening spaced from the first opening for passing the cellulosic material to said internal feeder means; and
    b. means for passing a treatment liquid into said impregnation chamber so as to contact the cellulosic material as it passes from the first opening to the second opening.

8. An apparatus as recited in claim 7 wherein said internal feeder means extends from said partition means within said vessel externally thereof into said housing into said impregnation chamber through the second opening thereto.

9. An apparatus as recited in claim 8 wherein said external feeder means comprises a compacting screw feeder for dewatering and deaerating the cellulosic material prior to introduction to said impregnating chamber.

10. An apparatus as recited in claim 9 wherein said internal feeder means comprises a triple-flight intermeshing screw feeder.

11. An apparatus as recited in claim 1 wherein said longitudinally elongated vessel is inclined at an acute angle with the horizontal, said partition means disposed along the inclined longitudinal axis of said vessel for dividing the treatment chamber into a longitudinally elongated first subchamber disposed above said partition means and a longitudinally elongated second subchamber disposed beneath said partition means.

12. An apparatus as recited in claim 11 wherein said internal feeder means dispenses cellulosic material downwardly into said second subchamber disposed beneath said partition means to the transport means disposed therein.

13. An apparatus as recited in claim 12 further comprising drive means operatively associated with said transport means for moving said transport means beneath said internal feeder means to receive the cellulosic material and for transporting the received cellulosic material downwardly through said second subchamber in the first liquid filled portion of the treatment chamber, thence upwardly through said first subchamber in the first liquid filled portion of the treatment chamber, thence through the liquid-vapor interface in said first subchamber, thence upwardly through said first subchamber in the second vapor filled portion of the treatment chamber, and thence downwardly through said second subchamber in the second vapor filled portion of the treatment chamber to the cellulosic material withdrawal means.

14. An apparatus as recited in claim 13 wherein said transport means comprises an endless chain conveyor having a plurality of perforate conveyor flights mounted thereto.

15. An apparatus as recited in claim 14 wherein said internal feeder means comprises a triple-flight intermeshing screw feeder.

16. An apparatus as recited in claim 15 further comprising an external feeder means disposed outside of said vessel and opening in flow communication to said internal feeder means for passing cellulosic material to said internal feeder means for dispensing to said transport means.

17. An apparatus as recited in claim 16 wherein said external feeder means comprises a compacting screw feeder for dewatering and deaerating the cellulosic material prior to introduction to said internal feeder means.

* * * * *